UNITED STATES PATENT OFFICE.

AMASA RIPPETOE, OF TERRELL, TEXAS.

MEDICAL COMPOUND.

SPECIFICATION forming part of Letters Patent No. 235,704, dated December 21, 1880.

Application filed April 30, 1880. (Specimens.)

*To all whom it may concern:*

Be it known that I, AMASA RIPPETOE, of Terrell, in the county of Kaufman and State of Texas, have invented certain new and useful Improvements in Medical Compounds; and I do hereby declare that the following is a full, clear, and exact description of the invention, which will enable others skilled in the art to which it appertains to make and use the same.
This invention relates to a medical compound designed for the treatment of diseases of the throat and lungs; and it consists of a decoction made of the leaves and stems of a plant known by the botanical name of "*Am-* *phiachyris dracunculoides,*" to which are added white sugar, spirits, and decoction of sarsaparilla, in about the proportions hereinafter more fully described and claimed.

To prepare the medicine, I first place in a suitable vessel or boiler containing water a quantity of amphiachyris sufficient to make a strong decoction. This is allowed to boil briskly until the strength of the herb is extracted. After straining I add to each gallon of the decoction about eight pounds of white sugar and again boil the mixture until it becomes of the consistence of common sirup, any impurities that may arise to the surface being removed by skimming. To each gallon of this sirup I add one pint of the best spirits, or enough to prevent fermentation. I then add to each gallon of this last mixture one quart of a decoction of sarsaparilla made in the usual manner. After straining the compound will be ready for bottling.

This compound, which forms a medicinal sirup strongly impregnated with resin or balsam of amphiachyris, is pleasing to the taste, and possesses purifying and healing properties that render it useful in diseases of the blood, throat, and lungs. It should be taken in doses of one table-spoonful, for adults, three times a day, or oftener, preferably after eating, one-half this quantity being usually sufficient for children.

Having thus described my invention, what I claim is—

The herein-described medical compound, consisting of a decoction of *Amphiachyris dracunculoides*, white sugar, spirits, and decoction of sarsaparilla, in about the proportions set forth.

In testimony that I claim the foregoing as my own I have hereto affixed my signature in presence of two witnesses.

AMASA RIPPETOE.

Witnesses:
   E. L. McWILLIAMS,
   I. A. McWILLIAMS.